US009573327B2

(12) United States Patent
Sampica et al.

(10) Patent No.: US 9,573,327 B2
(45) Date of Patent: Feb. 21, 2017

(54) PLANARIZATION TREATMENT OF PRESSURE SENSITIVE ADHESIVE FOR RIGID-TO-RIGID SUBSTRATE LAMINATION

(71) Applicants: James D. Sampica, Springville, IA (US); Paul R. Nemeth, Cedar Rapids, IA (US); Tracy J. Barnidge, Marion, IA (US); Vincent P. Marzen, Robins, IA (US)

(72) Inventors: James D. Sampica, Springville, IA (US); Paul R. Nemeth, Cedar Rapids, IA (US); Tracy J. Barnidge, Marion, IA (US); Vincent P. Marzen, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 296 days.

(21) Appl. No.: 14/070,251

(22) Filed: Nov. 1, 2013

(65) Prior Publication Data

US 2014/0057012 A1   Feb. 27, 2014

Related U.S. Application Data

(62) Division of application No. 12/009,472, filed on Jan. 18, 2008, now Pat. No. 8,603,288.

(51) Int. Cl.
*B29C 43/12* (2006.01)
*B29D 7/01* (2006.01)
(Continued)

(52) U.S. Cl.
CPC .............. *B29D 7/01* (2013.01); *B29C 43/12* (2013.01); *B29C 43/203* (2013.01);
(Continued)

(58) Field of Classification Search
CPC .............. B29C 2043/3647; B29C 2043/3649; B29C 70/44; B29C 43/3642; B29C 37/01; B32B 37/1009
See application file for complete search history.

(56) References Cited

U.S. PATENT DOCUMENTS 3,089,801 A   5/1963  Tierney et al.
3,616,197 A   10/1971 Amberg et al.
(Continued)

FOREIGN PATENT DOCUMENTS

EP   0 556 351 B1   6/1995
EP   0 962 752 A1   12/1999
(Continued)

OTHER PUBLICATIONS

First Office Action with English Translation received in Korean Patent Application No. 10-2010-7017278, dated Feb. 24, 2015, 9 pages.

(Continued)

*Primary Examiner* — Christopher Schatz
(74) *Attorney, Agent, or Firm* — Donna P. Suchy; Daniel M. Barbieri

(57) ABSTRACT

The present invention is a process for performing a planarization treatment of pressure-sensitive adhesive (PSA). The process includes positioning a first substrate onto a support surface of a planarization tool. The process further includes placing at least one layer of PSA onto the first substrate. The process further includes positioning a second substrate onto the layer(s) of PSA. The process further includes applying a pressure to the second substrate via a flexible membrane, said pressure being applied in a generally uniform, unidirectional and localized manner. Further, the applied pressure flattens the PSA between the first (Continued)

substrate and the second substrate for promoting suitability of the PSA for use in rigid-to-rigid lamination processes.

20 Claims, 8 Drawing Sheets

(51) Int. Cl.
| | |
|---|---|
| *B29C 43/20* | (2006.01) |
| *B29C 43/36* | (2006.01) |
| *B29C 53/18* | (2006.01) |
| *B32B 7/12* | (2006.01) |
| *B32B 15/08* | (2006.01) |
| *B32B 25/08* | (2006.01) |
| *B32B 27/08* | (2006.01) |
| *B32B 27/32* | (2006.01) |
| *B29C 33/20* | (2006.01) |
| *B29C 43/32* | (2006.01) |

(52) U.S. Cl.
CPC .......... *B29C 43/3642* (2013.01); *B29C 53/18* (2013.01); *B32B 7/12* (2013.01); *B32B 15/08* (2013.01); *B32B 25/08* (2013.01); *B32B 27/08* (2013.01); *B32B 27/32* (2013.01); *B29C 33/20* (2013.01); *B29C 2043/3233* (2013.01); *B29C 2043/3647* (2013.01); *B29C 2043/3649* (2013.01); *B32B 2250/05* (2013.01); *B32B 2250/40* (2013.01); *B32B 2255/10* (2013.01); *B32B 2255/26* (2013.01); *B32B 2457/00* (2013.01); *B32B 2457/08* (2013.01); *B32B 2457/202* (2013.01); *B32B 2457/206* (2013.01); *B32B 2457/208* (2013.01); *Y10T 428/28* (2015.01)

(56) References Cited

U.S. PATENT DOCUMENTS

| | | | |
|---|---|---|---|
| 3,851,758 A | 12/1974 | Makhijani et al. | |
| 3,960,635 A | 6/1976 | La Roy et al. | |
| 4,078,962 A | 3/1978 | Krueger | |
| 4,188,254 A | 2/1980 | Hemperly, Jr. | |
| 4,235,951 A | 11/1980 | Swarovski | |
| 4,737,182 A | 4/1988 | Fecik et al. | |
| 4,747,577 A | 5/1988 | Dimock | |
| 4,756,735 A | 7/1988 | Cathers et al. | |
| 5,108,532 A | 4/1992 | Thein et al. | |
| 5,273,553 A | 12/1993 | Hoshi et al. | |
| 5,329,391 A | 7/1994 | Miyamoto et al. | |
| 5,365,356 A | 11/1994 | McFadden | |
| 5,566,840 A | 10/1996 | Waldner et al. | |
| 5,592,288 A | 1/1997 | Sampica et al. | |
| 5,678,303 A | 10/1997 | Wichmann | |
| 5,918,517 A | 7/1999 | Malapert et al. | |
| 5,942,062 A | 8/1999 | Hassall et al. | |
| 5,950,512 A | 9/1999 | Fields | |
| 5,959,762 A | 9/1999 | Bandettini et al. | |
| 6,128,066 A | 10/2000 | Yokozeki | |
| 6,366,013 B1 | 4/2002 | Leenders et al. | |
| 6,388,724 B1 | 5/2002 | Campbell et al. | |
| 6,481,482 B1 | 11/2002 | Shimotomai | |
| 6,614,057 B2 | 9/2003 | Silvernail et al. | |
| 6,681,668 B1 | 1/2004 | Smirle | |
| 6,739,929 B2 | 5/2004 | Furukawa et al. | |
| 6,760,155 B2 | 7/2004 | Murayama et al. | |
| 6,803,245 B2 | 10/2004 | Auch et al. | |
| 6,832,538 B1 | 12/2004 | Hwang | |
| 6,842,288 B1 | 1/2005 | Liu et al. | |
| 6,908,202 B2 | 6/2005 | Graf et al. | |
| 6,917,396 B2 | 7/2005 | Hiraishi et al. | |
| 6,984,545 B2 | 1/2006 | Grigg et al. | |
| 6,998,648 B2 | 2/2006 | Silvernail | |
| 7,030,945 B2 | 4/2006 | Umemoto et al. | |
| 7,273,403 B2 | 9/2007 | Yokota et al. | |
| 7,349,154 B2 | 3/2008 | Aiura et al. | |
| 7,361,240 B2 | 4/2008 | Kim | |
| 7,381,110 B1 | 6/2008 | Sampica et al. | |
| 7,435,311 B1 | 10/2008 | Marzen et al. | |
| 7,446,938 B2 | 11/2008 | Miyatake et al. | |
| 7,452,258 B1 | 11/2008 | Marzen et al. | |
| 7,528,915 B2 | 5/2009 | Choi et al. | |
| 7,551,451 B2 | 6/2009 | Kim et al. | |
| 7,566,254 B2 | 7/2009 | Sampica et al. | |
| 7,633,584 B2 | 12/2009 | Umemoto et al. | |
| 7,814,676 B2 | 10/2010 | Sampica et al. | |
| 7,927,440 B2 | 4/2011 | Matsuhira | |
| 7,929,086 B2 | 4/2011 | Toyama et al. | |
| 8,038,498 B2 | 10/2011 | Miyauchi et al. | |
| 8,045,098 B2 | 10/2011 | Kitagawa et al. | |
| 8,102,487 B2 | 1/2012 | Kitagawa et al. | |
| 8,118,075 B2 | 2/2012 | Sampica et al. | |
| 8,137,498 B2 | 3/2012 | Sampica et al. | |
| 8,486,535 B1 | 7/2013 | Nemeth et al. | |
| 8,540,002 B2 | 9/2013 | Sampica et al. | |
| 8,603,288 B2 | 12/2013 | Sampica et al. | |
| 8,691,043 B2 | 4/2014 | Sampica et al. | |
| 2001/0035921 A1* | 11/2001 | Yamanami | G02F 1/133308 349/58 |
| 2001/0050372 A1 | 12/2001 | Krijn et al. | |
| 2001/0053648 A1 | 12/2001 | Furukawa et al. | |
| 2002/0179229 A1 | 12/2002 | Chuzles | |
| 2002/0186343 A1 | 12/2002 | Liao et al. | |
| 2002/0187284 A1 | 12/2002 | Kinoshita et al. | |
| 2003/0038916 A1 | 2/2003 | Nakano et al. | |
| 2003/0043315 A1 | 3/2003 | Umemoto et al. | |
| 2003/0067268 A1* | 4/2003 | Matsuoka | H01L 51/5237 313/512 |
| 2003/0089214 A1 | 5/2003 | Fukuta et al. | |
| 2003/0156238 A1 | 8/2003 | Hiraishi et al. | |
| 2003/0174396 A1 | 9/2003 | Murayama et al. | |
| 2003/0180528 A1 | 9/2003 | Flosenzier et al. | |
| 2003/0189606 A1 | 10/2003 | Moon et al. | |
| 2004/0066645 A1 | 4/2004 | Graf et al. | |
| 2004/0130073 A1* | 7/2004 | Yamazaki | G06Q 10/083 264/483 |
| 2005/0126679 A1 | 6/2005 | Kim | |
| 2005/0136625 A1 | 6/2005 | Henseler et al. | |
| 2005/0249946 A1 | 11/2005 | Hsu et al. | |
| 2006/0035060 A1 | 2/2006 | Koyama et al. | |
| 2006/0098452 A1 | 5/2006 | Choi et al. | |
| 2006/0207967 A1 | 9/2006 | Bocko et al. | |
| 2006/0215265 A1 | 9/2006 | Miyatake et al. | |
| 2006/0245171 A1 | 11/2006 | Kim et al. | |
| 2006/0290253 A1 | 12/2006 | Yeo et al. | |
| 2007/0022895 A1* | 2/2007 | Lee | H01L 51/5237 101/494 |
| 2007/0031997 A1 | 2/2007 | Lee et al. | |
| 2007/0228586 A1 | 10/2007 | Merrill et al. | |
| 2007/0297736 A1 | 12/2007 | Sherman et al. | |
| 2008/0145610 A1 | 6/2008 | Muller et al. | |
| 2008/0305721 A1 | 12/2008 | Ohashi et al. | |
| 2009/0040772 A1 | 2/2009 | Laney | |
| 2009/0046229 A1 | 2/2009 | Umemoto et al. | |
| 2009/0120572 A1 | 5/2009 | Sampica et al. | |
| 2009/0120585 A1 | 5/2009 | Sampica et al. | |
| 2009/0126872 A1 | 5/2009 | Sampica et al. | |
| 2009/0148682 A1 | 6/2009 | Higuchi | |
| 2009/0153783 A1 | 6/2009 | Umemoto | |
| 2009/0183381 A1 | 7/2009 | Sampica et al. | |
| 2009/0183615 A1 | 7/2009 | Sampica et al. | |
| 2009/0186218 A1 | 7/2009 | Sampica et al. | |
| 2009/0279030 A1 | 11/2009 | Toyama et al. | |
| 2009/0279175 A1 | 11/2009 | Laney et al. | |
| 2010/0103353 A1 | 4/2010 | Yamada | |
| 2010/0297406 A1 | 11/2010 | Schaffer et al. | |
| 2011/0075070 A1 | 3/2011 | Kitagawa et al. | |
| 2011/0085279 A1 | 4/2011 | Lanagan et al. | |
| 2011/0141405 A1 | 6/2011 | Kitagawa et al. | |
| 2011/0165361 A1 | 7/2011 | Sherman et al. | |

(56) References Cited

U.S. PATENT DOCUMENTS

FOREIGN PATENT DOCUMENTS

| | | |
|---|---|---|
| EP | 0 711 103 B1 | 3/2000 |
| JP | 01-210328 | 8/1989 |
| JP | 05-200880 | 8/1993 |
| JP | 05-293895 | 11/1993 |
| JP | 06-051484 | 2/1994 |
| JP | H08-220547 A | 8/1996 |
| JP | 09-057779 | 3/1997 |
| JP | 10-156853 | 6/1998 |
| JP | 10-244589 | 9/1998 |
| JP | 2000-141388 | 5/2000 |
| JP | 2000-176931 | 6/2000 |
| JP | 2001-005401 A | 1/2001 |
| JP | 2001-166272 | 6/2001 |
| JP | 2002-137352 | 5/2002 |
| JP | 2002-313688 | 10/2002 |
| JP | 2003-288028 | 10/2003 |
| JP | 2004-058349 | 2/2004 |
| JP | 2004-233590 | 8/2004 |
| JP | 2004-354645 | 12/2004 |
| JP | 2005-005029 | 1/2005 |
| JP | 2005-116346 | 4/2005 |
| JP | 2006-218658 | 8/2006 |
| JP | 2006-222267 | 8/2006 |
| JP | 2006-290960 | 10/2006 |
| JP | 2006-334912 | 12/2006 |
| JP | 2006-348208 | 12/2006 |
| JP | 2007-206559 | 8/2007 |
| JP | 2007-302398 A | 11/2007 |
| JP | 2008-238607 | 1/2008 |
| KR | 10-1999-029922 | 4/1999 |
| KR | 2001-166272 | 6/2001 |
| KR | 10-2007-0016614 | 2/2007 |
| WO | WO-93/05634 | 3/1993 |
| WO | WO-2004/046230 | 6/2004 |
| WO | WO-2005/098522 | 10/2005 |
| WO | WO-2007/063818 | 6/2007 |
| WO | WO-2011/089474 A2 | 7/2011 |

OTHER PUBLICATIONS

Donald, "Methods for improving the mechanical properties of oxide glasses," Journal of Materials Science 24, (1989), pp. 4177-4208.
Non-Final Office Action on U.S. Appl. No. 13/867,556 Dated Apr. 10, 2015, 11 pages.
Extended European Search Report for European Patent Application No. 14161363, dated May 16, 2014, 6 pages.
Final Office Action on U.S. Appl. No. 13/867,556 Dated Jul. 3, 2014, 11 pages.
Notice of Allowance on U.S. Appl. No. 14/019,429 Dated Feb. 5, 2014, 7 pages.
Office Action on U.S. Appl. No. 12/009,482 Dated Feb. 4, 2014, 14 pages.
Second Office Action for Chinese Patent Application No. 2009801072945, dated May 30, 2014 with English translation, 4 pages.
Office Action on U.S. Appl. No. 13/867,556 Dated Feb. 7, 2014, 11 pages.
U.S. Appl. No. 12/009,372, filed Jan. 18, 2008, Sampica et al.
U.S. Appl. No. 12/009,373, filed Jan. 18, 2008, Sampica et al.
U.S. Appl. No. 12/009,375, filed Jan. 18, 2008, Sampica et al.
U.S. Appl. No. 12/009,393, filed Jan. 18, 2008, Sampica et al.
U.S. Appl. No. 12/009,472, filed Jan. 18, 2008, Sampica et al.
U.S. Appl. No. 12/009,482, filed Jan. 18, 2008, Barnidge et al.
U.S. Appl. No. 12/786,169, filed May 24, 2010, Nemeth et al.
Advisory Action for U.S. Appl. No. 12/009,472, mail date Feb. 25, 2013, 3 pages.
Advisory Action for U.S. Appl. No. 12/009,482, mail date Oct. 28, 2013, 3 pages.
Advisory Action for U.S. Appl. No. 13/538,957, mail date Jun. 14, 2013, 6 pages.
International Search Report for Application No. PCT/US2009/031151, mail date Aug. 28, 2009, 3 pages.
Kipp, D.O. (2004;2010). Plastic Material Data Sheets. MatWeb—Division of Automation Creation, Inc., Online version available at: http://www.knovel.com/web/portal/browse/display?_EXT_KNOVEL_DISPLAY_bookid=1023&VerticalID=0, at least as early as Aug. 10, 2011, 6 pages.
Notice of Allowance for U.S. Appl. No. 12/009,372, mail date Oct. 13, 2011, 8 pages.
Notice of Allowance for U.S. Appl. No. 12/009,373, mail date Jun. 16, 2010, 4 pages.
Notice of Allowance for U.S. Appl. No. 12/009,375, mail date Nov. 21, 2013, 12 pages.
Notice of Allowance for U.S. Appl. No. 12/009,393, mail date Nov. 14, 2011, 7 pages.
Notice of Allowance for U.S. Appl. No. 12/009,472, mail date Sep. 5, 2013, 8 pages.
Notice of Allowance for U.S. Appl. No. 12/786,169, mail date Mar. 28, 2013, 6 pages.
Notice of Allowance for U.S. Appl. No. 13/420,381, mail date Feb. 11, 2013, 12 pages.
Notice of Allowance for U.S. Appl. No. 13/420,381, mail date May 20, 2013, 8 pages.
Notice of Allowance for U.S. Appl. No. 13/538,957, mail date Oct. 3, 2013, 13 pages.
Office Action for Chinese Application No. 200980107294.5, mail date Oct. 8, 2013, 5 pages.
Office Action for U.S. Appl. No. 12/009,372, mail date Dec. 20, 2010, 10 pages.
Office Action for U.S. Appl. No. 12/009,372, mail date Jun. 13, 2011, 9 pages.
Office Action for U.S. Appl. No. 12/009,373, mail date Dec. 30, 2009, 14 pages.
Office Action for U.S. Appl. No. 12/009,375, mail date Jul. 3, 2013, 14 pages.
Office Action for U.S. Appl. No. 12/009,375, mail date Jul. 22, 2011, 8 pages.
Office Action for U.S. Appl. No. 12/009,375, mail date Mar. 28, 2011, 9 pages.
Office Action for U.S. Appl. No. 12/009,393, mail date Jul. 20, 2011, 8 pages.
Office Action for U.S. Appl. No. 12/009,472, mail date Apr. 16, 2012, 16 pages.
Office Action for U.S. Appl. No. 12/009,472, mail date Jan. 14, 2011, 14 pages.
Office Action for U.S. Appl. No. 12/009,472, mail date Mar. 20, 2013, 15 pages.
Office Action for U.S. Appl. No. 12/009,472, mail date Nov. 3, 2011, 15 pages.
Office Action for U.S. Appl. No. 12/009,472, mail date Nov. 9, 2012, 15 pages.
Office Action for U.S. Appl. No. 12/009,482, mail date Feb. 21, 2012, 20 pages.
Office Action for U.S. Appl. No. 12/009,482, mail date Jun. 28, 2013, 22 pages.
Office Action for U.S. Appl. No. 12/009,482, mail date Nov. 21, 2012, 20 pages.
Office Action for U.S. Appl. No. 12/009,482, mail date Aug. 16, 2011, 16 pages.
Office Action for U.S. Appl. No. 12/786,169, mail date Jan. 18, 2013, 14 pages.
Office Action for U.S. Appl. No. 13/538,957, mail date Apr. 4, 2013, 19 pages.
Office Action for U.S. Appl. No. 13/538,957, mail date Oct. 5, 2012, 18 pages.
Office Action for U.S. Appl. No. 12/786,169, mail date Jul. 20, 2012, 8 pages.
Office Action for U.S. Appl. No. 13/420,381, mail date Sep. 18, 2012, 9 pages.
Restriction Requirement for U.S. Appl. No. 12/009,482, mail date May 13, 2011, 6 pages.
Restriction Requirement for U.S. Appl. No. 13/867,556, mail date Dec. 26, 2013, 6 pages.

(56) References Cited

OTHER PUBLICATIONS

Walker, GD-Itronix Dynavue Technology, The Ultimate Outdoor-Readable Touch-Screen Display, Rugged PC Review, 4 pages.
English Translation of Japanese Notice of Reasons for Rejection in Japanese Patent Application No. JP 2013-251126, dated Oct. 15, 2014, 3 pages.
Notice of Allowance for U.S. Appl. No. 12/009,482 Dated Oct. 6, 2014, 8 pages.
Non-Final Office Action on U.S. Appl. No. 13/867,556 Dated Nov. 25, 2014, 10 pages.
Office Action in Japanese Patent Application 2015-116688, dated Aug. 25, 2015, 4 pages.
Office Action in Japanese Patent Application 2015-116716, dated Aug. 25, 2015, 3 pages.
Office Action with English Translation received in Korean Patent Application 10-2010-7017278, dated Aug. 26, 2015, 5 pages.
Final Office Action on U.S. Appl. No. 14/270,587, dated Nov. 3, 2016, 17 pages.
First Office Action on Korean Patent Application No. 10-2016-7013740, dated Sep. 19, 2016, 7 pages.
Non-Final Office Action on U.S. Appl. No. 14/270,563, dated Aug. 25, 2016, 20 pages.

\* cited by examiner

PLANARIZATION TREATMENT OF PRESSURE SENSITIVE ADHESIVE FOR RIGID-TO-RIGID SUBSTRATE LAMINATION

CROSS-REFERENCE TO RELATED PATENT APPLICATIONS

The present application is a divisional of U.S. application Ser. No. 12/009,472, filed Jan. 18, 2008, which is incorporated by reference herein in its entirety.

The present application incorporates by reference in their entireties each of the following applications: U.S. patent application Ser. No. 11/214,518 entitled: "Process for Glass-To-Glass Sealing OLEDS with Dry Film Adhesive" filed Aug. 30, 2005; U.S. patent application Ser. No. 11/215,683 entitled: "Panel-To-Panel Lamination Method for Improved Uniformity" filed Aug. 30, 2005; U.S. patent application Ser. No. 12/009,375, entitled: "Substrate Lamination System and Method" filed Jan. 18, 2008 and having Express Mail Mailing Label Number EM 117518596 US; U.S. patent application Ser. No. 12/009,482, entitled: "Substrate Lamination System and Method" filed Jan. 18, 2008 and having Express Mail Mailing Label Number EM 117518605 US; U.S. patent application Ser. No. 12/009,372, entitled: "System and Method for Disassembling Laminated Substrates" filed Jan. 18, 2008 and having Express Mail Mailing Label Number EM 117518675 US; U.S. patent application Ser. No. 12/009,373, entitled: "Alignment System and Method Thereof" filed Jan. 18, 2008 and having Express Mail Mailing Label Number EM 117518667 US; and U.S. patent application Ser. No. 12/009,393, entitled: "System And Method For Completing Lamination Of Rigid-To-Rigid Substrates By The Controlled Application Of Pressure" filed Jan. 18, 2008 and having Express Mail Mailing Label Number EM 117518640 US.

FIELD

The present invention relates to the field of lamination processes and particularly to a process involving planarization treatment of pressure sensitive adhesives, said process allowing said pressure sensitive adhesives to be suitable for use in rigid-to-rigid substrate lamination.

BACKGROUND

Currently existing lamination processes, such as liquid lamination processes, may be used for rigid-to-rigid substrate lamination. However, such processes may be time-consuming, inefficient, expensive and/or capital intensive. Alternatively, other currently existing lamination processes, such as dry-film lamination processes, may not be suitable for use in rigid-to-rigid substrate lamination because said dry-film lamination processes may produce laminated assemblies in which voids or bubbles (due to gas entrapment occurring during the lamination process) are present therein. For example, if the laminated assembly is a display assembly, said voids or bubbles may cause the appearance of undesirable optical effects or visual anomalies, such as visible blotches in the display. Further, said dry-film lamination processes may result in/may produce one or more of the following: substrate breakage; laminated assemblies having poor performance; and/or laminated assemblies having poor repairability. The above-referenced shortcomings of the dry-film lamination processes may be due at least in part to their implementation of adhesive material which is not suitable for use in rigid-to-rigid lamination.

Thus, it would be desirable to provide a process for preparing pressure-sensitive adhesive for use in rigid-to-rigid substrate lamination which provides an adhesive product which obviates the problems associated with current solutions.

SUMMARY

Accordingly, an embodiment of the present invention is directed to a system for performing planarization treatment of pressure-sensitive adhesive (PSA), the system including: a planarization tool, the planarization tool including a support portion and a carriage, the support portion including a support surface configured for supporting at least one PSA block, the carriage having at least one aperture formed therethrough, the carriage configured for being placed upon the support surface, the support portion and the carriage further configured for forming a partial enclosure when the carriage is placed upon the support surface; a pressurization tool configured with a partial enclosure, the partial enclosure of the pressurization tool having a port configured for connection to a pressurizing source; a flexible membrane configured for being positioned between the planarization tool and the pressurization tool, the flexible membrane being further configured for sealing the partial enclosure of the pressurization tool to create a first sealed cavity and for sealing the partial enclosure of the planarization tool to create a second sealed cavity when placed between the planarization tool and pressurization tool, the flexible membrane is further configured for applying a pressure created within the first sealed cavity to the at least one PSA block when the first sealed cavity is pressurized, wherein the carriage of the planarization tool is configured for causing the flexible membrane to apply the pressure to the at least one PSA block in a generally uniform, unidirectional and localized manner, the applied pressure promoting suitability of the PSA for use in rigid-to-rigid lamination processes.

An additional embodiment of the present invention is directed to a process for performing a planarization treatment of pressure-sensitive adhesive (PSA), the process including: positioning a first substrate onto a support surface of a planarization tool; placing at least one layer of PSA onto the first substrate; positioning a second substrate onto the layer(s) of PSA; and applying a pressure to the second substrate via a flexible membrane, said pressure being applied in a generally uniform, unidirectional and localized manner, wherein the applied pressure flattens the PSA between the first substrate and the second substrate for promoting suitability of the PSA for use in rigid-to-rigid lamination processes.

A further embodiment of the present invention is directed to a pressure-sensitive adhesive (PSA) product for use in rigid-to-rigid lamination processes, the pressure-sensitive adhesive product formed by a planarization process including the steps of: positioning a first substrate onto a support surface of a planarization tool; placing at least one layer of PSA onto the first substrate; positioning a second substrate onto the layer(s) of PSA; and applying a pressure to the second substrate via a flexible membrane, said pressure being applied in a generally uniform, unidirectional and localized manner, wherein the applied pressure flattens the PSA between the first substrate and the second substrate, the applied pressure, temperature at which the process is performed and duration for which the process is performed being selected for providing a pressure-sensitive adhesive product having at least one of a desired level of flatness and a desired degree of uniformity of flatness.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

DETAILED DESCRIPTION

Figure 1:
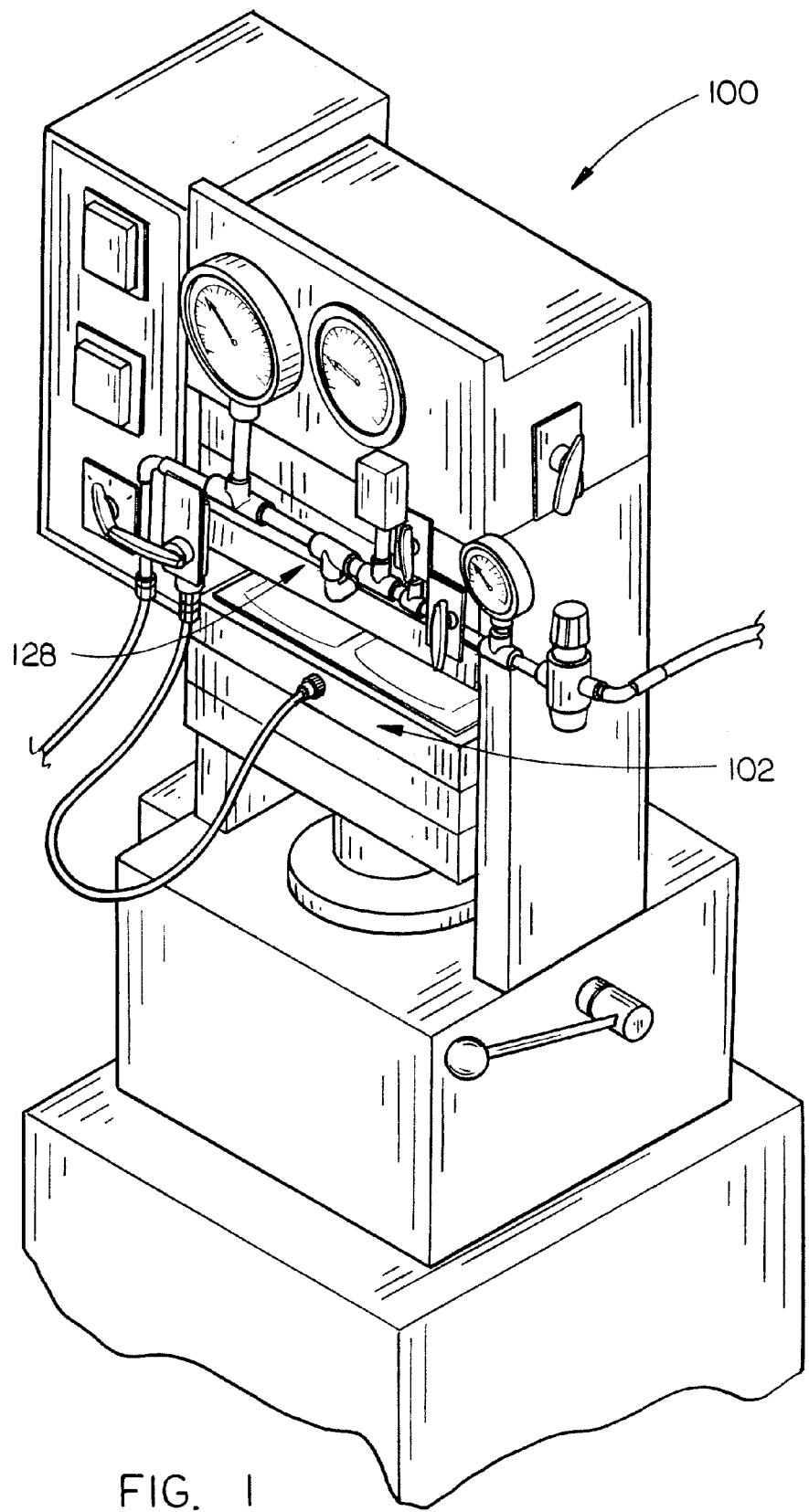
FIG. 1 is a view of a system for performing planarization treatment of pressure-sensitive adhesive (PSA) in accordance with an exemplary embodiment of the invention.

Reference will now be made in detail to the presently preferred embodiments of the invention, examples of which are illustrated in the accompanying drawings.

Referring generally to FIGS. 1-6 a system for performing planarization treatment of pressure-sensitive adhesive (PSA), such as commercially available PSA (ex—dry film pressure-sensitive adhesive, acrylic lamination material), is shown in accordance with an exemplary embodiment of the present invention. The planarization process/treatment of the present invention is performed for promoting increased suitability of the PSA for use in lamination processes, such as rigid-to-rigid lamination processes, in which rigid substrates may be joined/secured together via the PSA, said substrates being optical or non-optical substrates, or sheet-like assemblies (ex—Liquid Crystal Displays (LCDs), Organic Light-Emitting Diodes (OLEDs), Circuit Boards, Heat Sinks, etc.), in such a manner as to avoid the appearance of undesirable optical effects or visual anomalies (ex—blotches or voids on a display). The planarization process of the present invention promotes increased suitability of the PSA for rigid-to-rigid substrate lamination processes by flattening the PSA to a sufficient level of flatness and/or to a sufficient degree of uniformity of flatness to avoid the above-referenced undesirable optical effects/visual anomalies. In a current embodiment of the present invention, the system 100 includes a planarization tool 102. The planarization tool 102 includes a support portion 104. For instance, the support portion 104 may be a rectilinearly-shaped, tray-like apparatus. In an exemplary embodiment, the support portion 104 includes a support surface 106. The support surface 106 is configured for supporting one or more PSA blocks 108.

Figure 3:
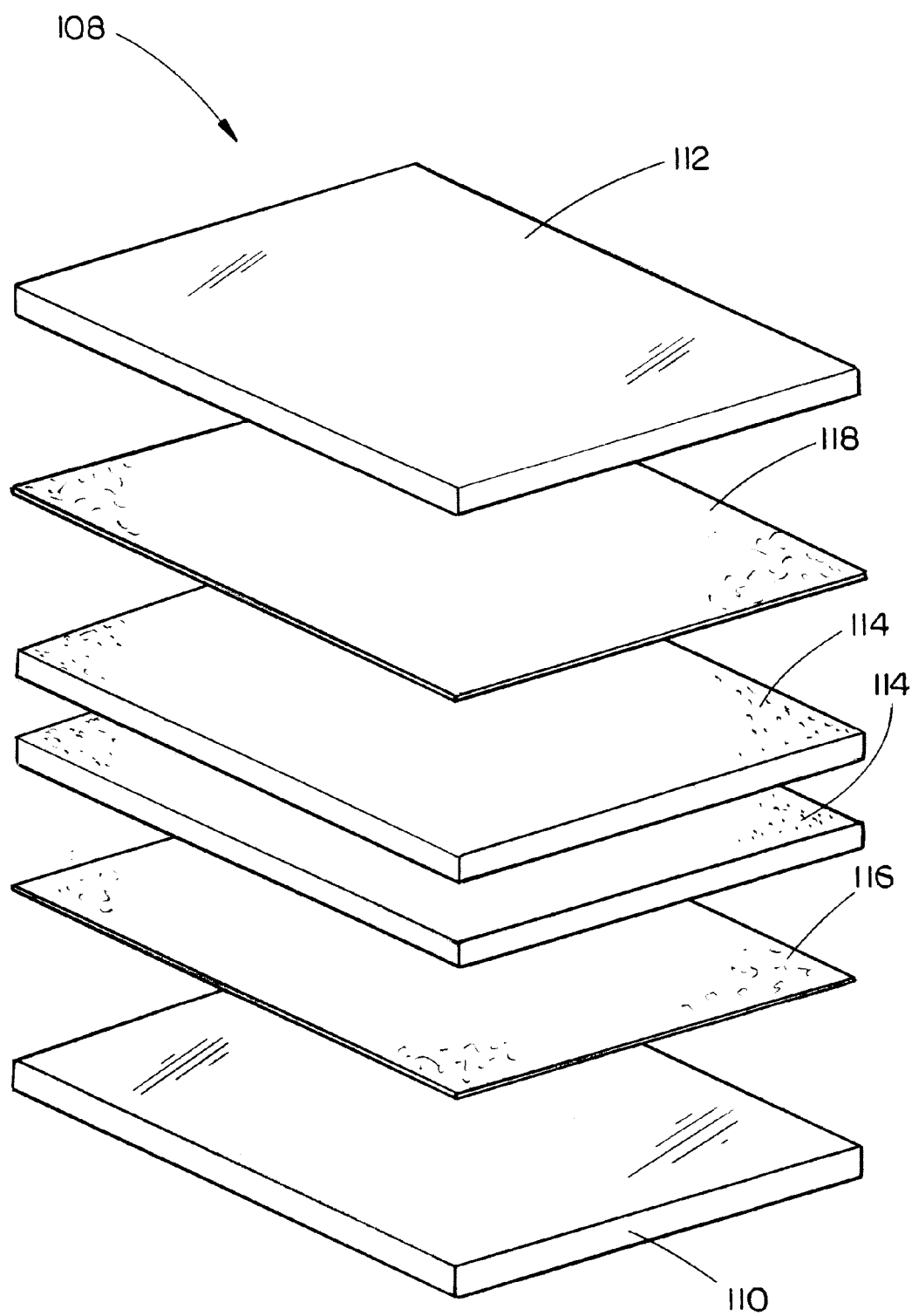
FIG. 3 is an exploded view of a PSA block which may be supported by the planarization tool in accordance with an exemplary embodiment of the present invention.

As shown in FIG. 3, one or more of the PSA blocks 108 may include a first substrate 110, a second substrate 112 and one or more layers of PSA 114, the one or more layers of PSA 114 being positioned or "sandwiched" between the first substrate 110 and the second substrate 112. Preferably the first substrate 110 and/or the second substrate 112 may be formed of glass (ex—may be glass plates. For example, the first substrate/glass plate 110 may have a first thickness, while the second substrate/glass plate 112 may have a second thickness, (ex-5 millimeters) the second thickness typically being greater than the first thickness (i.e., the first glass plate 110 may be a "thin" glass plate, the second glass plate 112 may be a "thick" glass plate). In alternative embodiments, the first substrate 110 and/or the second substrate 112 may be formed of plastic, metal, rubber or the like. In additional embodiments, the first substrate 110 may be LCD coverglass or a touch panel, and the PSA layer(s) 114 may be pre-adhered, pre-laminated, or pre-coated onto the first substrate 110 prior to being "sandwiched" by the second substrate 112 (ex—top glass plate/flattening glass). In further embodiments, one or more of the PSA blocks 108 may further include a first plastic film layer 116, the first plastic film layer 116 being positioned or "sandwiched" between the first substrate 110 and the PSA layer(s) 114. Still further, one or more of the PSA blocks 108 may further include a second plastic film layer 118, the second plastic film layer 118 being positioned or "sandwiched" between the second substrate 112 and the PSA layer(s) 114. For instance, the first and second plastic film layers (116, 118) may be formed of polyethylene, polyester, polypropylene, or the like. Further, the first and second plastic film layers (116, 118) may be positioned as described above in order to prevent the PSA layer(s) 114 from sticking/adhering to the first and second substrates (110, 112).

Figure 2:
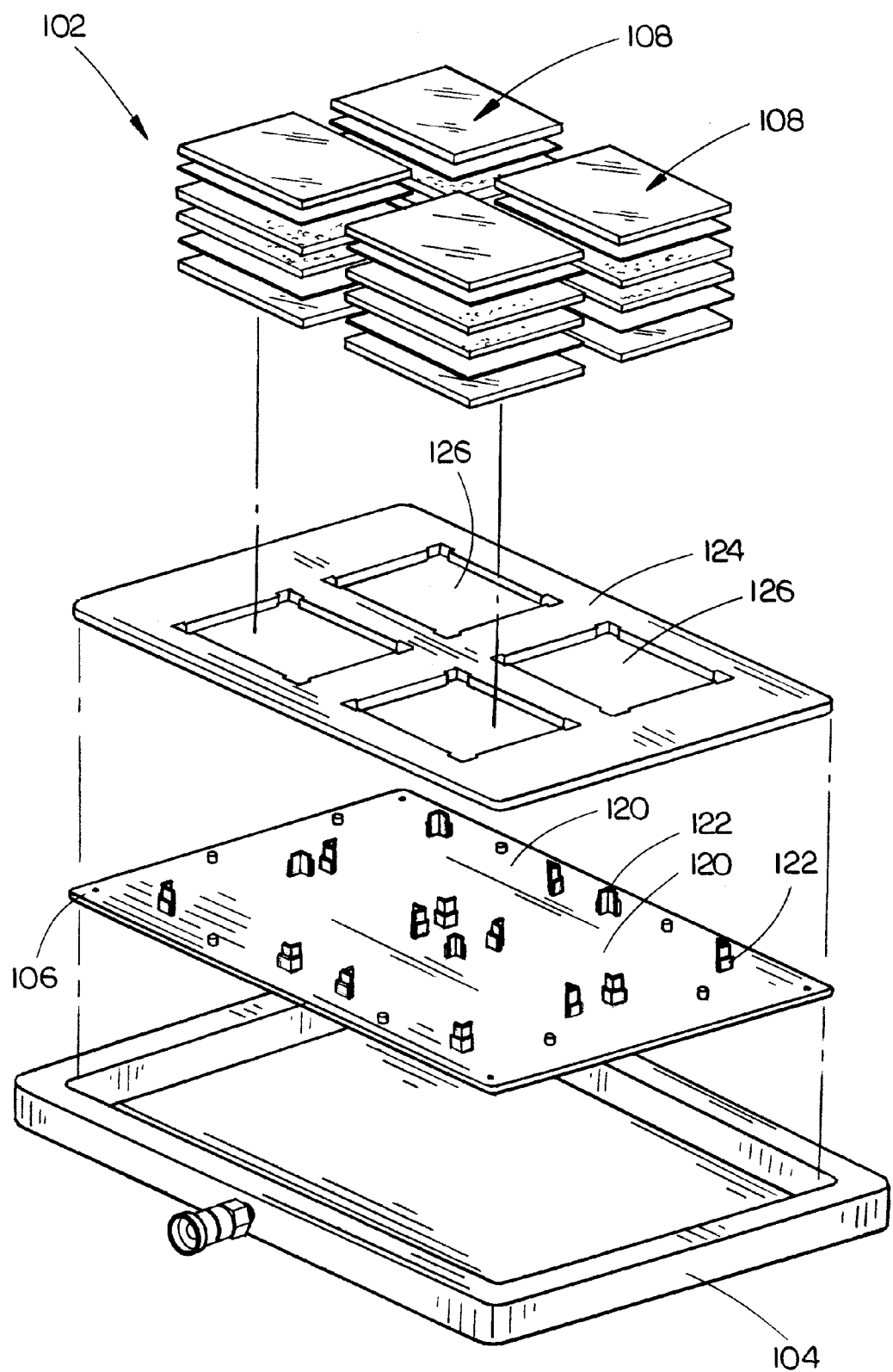
FIG. 2 is an exploded view of the planarization tool in accordance with an exemplary embodiment of the present invention.

In an exemplary embodiment, as shown in FIG. 2, the support surface 106 of the planarization tool 102 is configured with one or more holders or pockets 120. Each holder 120 may be shaped and sized for receiving at least one PSA block 108. For example, a holder 120 may be rectilinearly-shaped for receiving a correspondingly rectilinearly-shaped PSA block 108. Further, the holder 120 may include a plurality of brackets 122, such as corner brackets, for maintaining/securing the PSA block 108 within the holder 120. In alternative embodiments, the PSA block 108 may be secured within/by the holder via various mechanisms, such as by using clips, fasteners, edging or the like.

In current embodiments of the present invention, the planarization tool 102 may include a carriage, mask, or insert 124. The carriage 124 may be configured for being removably placed upon the support surface 106 of the support portion 104. For instance, the carriage 124 may be a rectilinearly-shaped lid or cover-like structure which may be seated within a correspondingly-shaped/sized tray-like or pan-like support portion 104 and upon the support surface 106. In further embodiments, when the carriage 124 is seated upon the support surface 106, the carriage 124 and the support portion 104 form a partial enclosure 125. (see FIG. 5).

In exemplary embodiments, a surface of the carriage 124 may form one or more apertures 126/may have one or more apertures 126 formed therethough. Further, the aperture(s) 126 may be shaped/sized for allowing physical access to PSA block(s) 108 positioned on the support surface 106. For example, one or more PSA block(s) 108 may be positioned within one or more holders 120 on the support surface 106 of the planarization tool 102. Further, as previously discussed, when the carriage 124 of the present invention is seated upon the support surface 106 and within the tray-like support portion 104, the support portion 104 and the carriage 124 form a partial enclosure 125. (see FIG. 5). Still further, the apertures 126 formed by the carriage 124 allow physical access to the PSA block(s) (ex—access to the second or top substrate 112) positioned within the holders 120 on the support surface 106. For instance, the apertures 126 may be formed such that when the carriage 124 is positioned on the support surface 106 and within the support portion 104, said apertures 126 may be aligned, shaped and sized so as to promote ease of physical access to PSA blocks 108 positioned within the holders 120 on the support surface 106. Further the number of apertures 126 of the carriage 124 may be equivalent to the number of holders 120 on the support surface 106.

In additional embodiments, as shown in FIG. 1, the system 100 includes a pressurization tool 128, such as a vacuum press or hydraulic press (ex—a 50 ton press). In exemplary embodiments, the pressurization tool 128 may be configured as/may form a partial enclosure 130, and may include a plenum or plenum diffuser screen 131 to promote uniformity. In further embodiments, the partial enclosure 130 may be configured with a port 132, said port 132 configured for being connected to a pressurizing source. In alternative embodiments, the pressurization tool 128 may be a pressure vessel.

Figure 4:
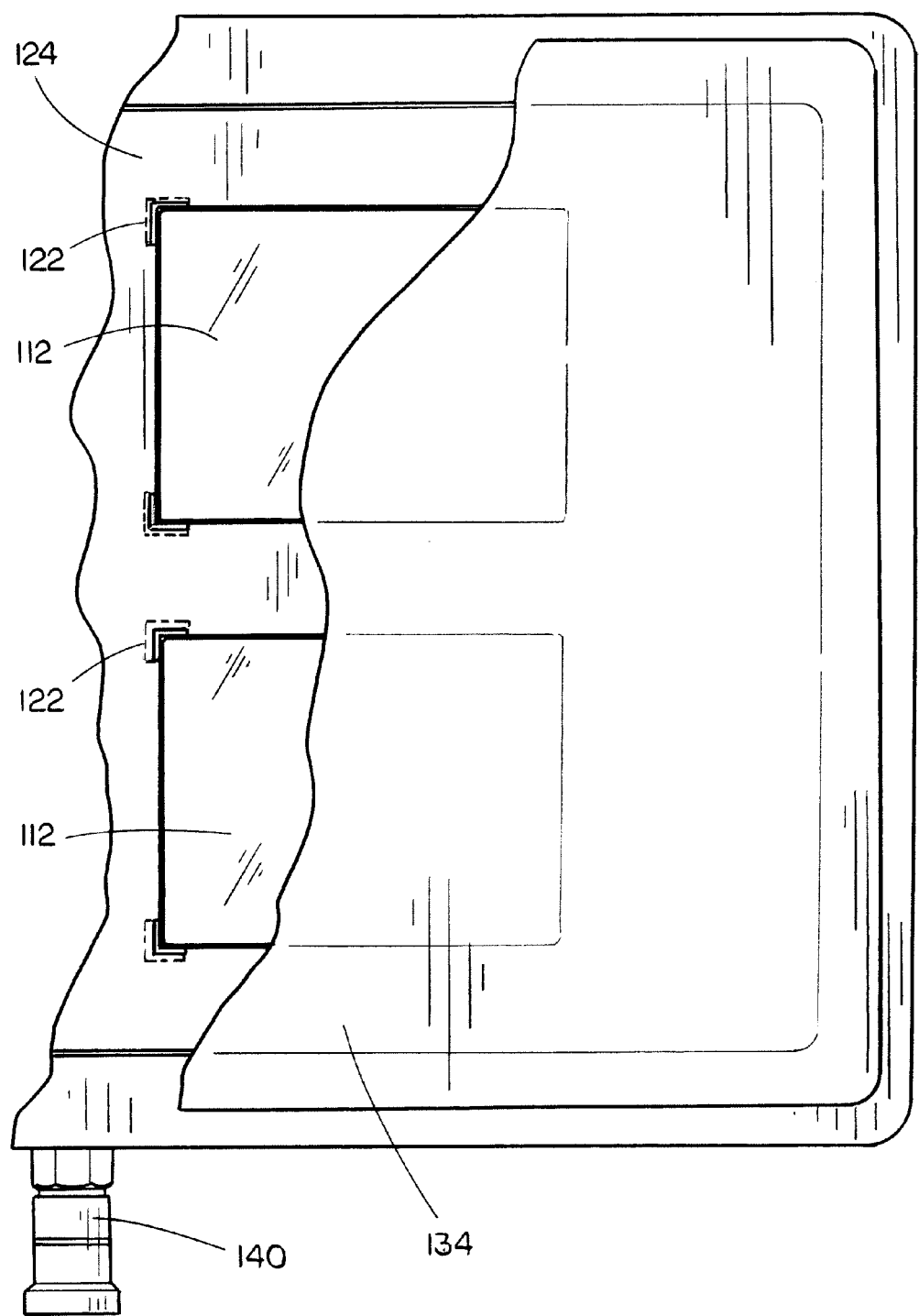
FIG. 4 is a cutaway view illustrating the flexible membrane positioned on the planarization tool, said planarization tool supporting a plurality of PSA blocks in accordance with an exemplary embodiment of the present invention.
Figure 5:
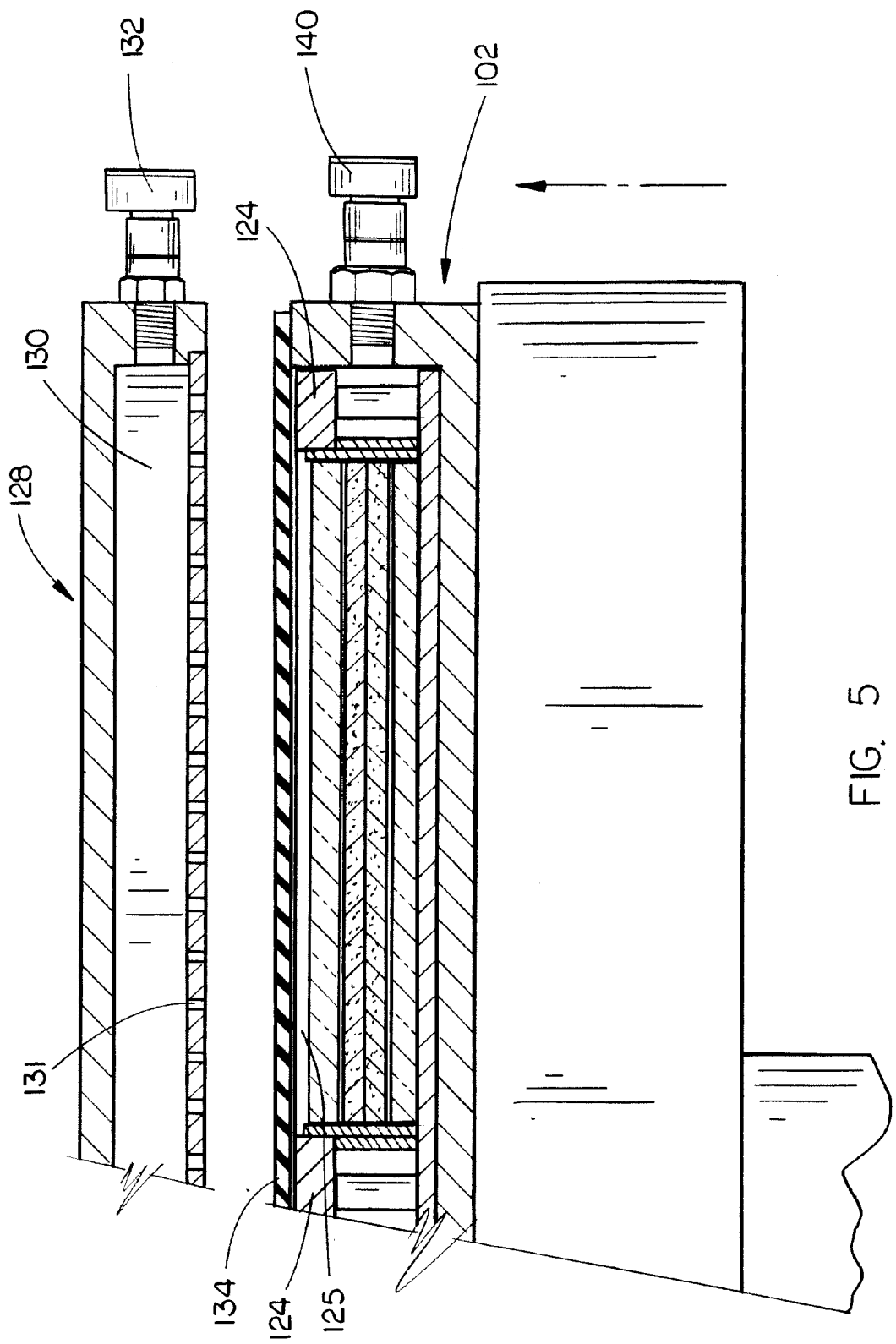
FIG. 5 is a cross-sectional view of the planarization tool, PSA block(s) and flexible membrane when implemented with a pressurization tool, said view depicting the pressurization tool and flexible membrane in a non-contact position, in accordance with an exemplary embodiment of the present invention.
Figure 6:
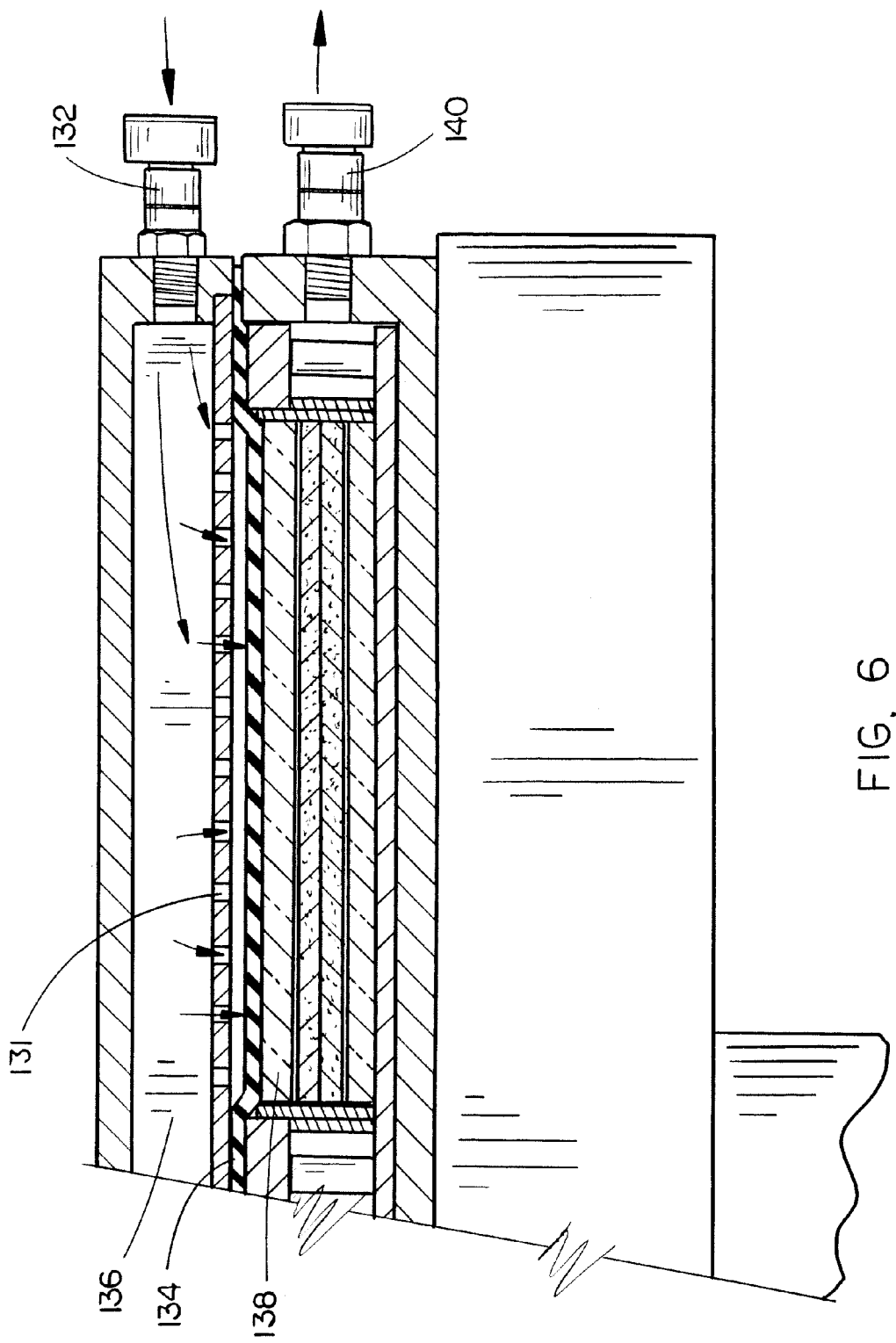
FIG. 6 is a cross-sectional view of the planarization tool, PSA block(s) and flexible membrane when implemented with a pressurization tool, said view depicting the pressurization tool and flexible membrane in contact with each other during planarization of the PSA, said view further depicting the pressurization of the sealed cavity formed by the flexible membrane and the pressurization tool, said view still further depicting the vacuum being pulled from the sealed cavity formed by the flexible membrane and the planarization tool.

In current embodiments of the present invention, as shown in FIGS. 4-6, the system 100 may include a flexible membrane 134. The flexible membrane 134 may be configured for being positioned or "sandwiched" between the planarization tool 102 and the pressurization tool 128. (See FIG. 6). When positioned or "sandwiched" between the planarization tool 102 and the pressurization tool 128, the flexible membrane 134 may further be configured for sealing the partial enclosure 130 of the pressurization tool 128 to create a first sealed cavity 136. Additionally, when positioned or "sandwiched" between the planarization tool 102 and the pressurization tool 128, the flexible membrane 134 may further be configured for sealing the partial enclosure 125 of the planarization tool 102 to create a second sealed cavity 138. In further embodiments, the flexible membrane 134 may be formed of an elastic material, such as silicone. Still further, the material forming the flexible membrane 134 may be chosen based on properties such as electrostatic discharge (ESD) properties, tear strength, elongational properties, or the like. Further, the flexible membrane 134 may be coated with one or more layers of plastic (ex—polyethylene) or other like material, the surface of which won't hold an electric charge (ex—an electric charge won't be created on its surface) when said material is peeled/pulled away/removed from another material/surface.

As discussed above, the partial enclosure 130 may be configured with a port 132, said port 132 configured for being connected to a pressurizing source. The partial enclosure 130 (See FIG. 5), including the plenum diffuser screen 131, may be directed or positioned against the flexible membrane 134, (See FIG. 6) said flexible membrane 134 having been positioned upon the planarization tool 102. When the flexible membrane 134 is positioned or "sandwiched" between the planarization tool 102 and the pressurization tool 128, the pressurization tool 128 is connected via the port 132 to a pressurizing source. Once the pressurization tool 128 is connected to the pressurizing source, the first sealed cavity 136 formed by the pressurization tool 128 (ex—partial enclosure 130 of the pressurization tool 128) and the flexible membrane 134 may be pressurized (ex—a positive pressure may be created within the first sealed cavity 136 as shown in FIG. 6). For example, the first sealed cavity 136 may be pressurized to a pressure from five (5) to two hundred (200) pounds per square inch gauge (psig). Preferably, the first sealed cavity is pressurized to a pressure of fifty (50) psig. The flexible membrane 134 may be configured for applying the pressure created within the first sealed cavity 136 to the PSA block(s) 108 positioned on the support surface 106 of the planarization tool 102. For instance, the positive pressure created within the first sealed cavity 136 may cause the flexible membrane to expand and be directed through/via the aperture(s) 126 of the carriage 124 against the second substrate 112 (ex—cover glass layer) of the PSA block, thereby exerting the applied pressure against the PSA block.

In exemplary embodiments, as shown in FIG. 6, the carriage 124 may be configured for causing the positive pressure applied by the flexible membrane 134 against the PSA block(s) 108 to be applied in a generally uniform, unidirectional, and localized manner, thereby avoiding the occurrence of isolated areas of pressure or areas of varying pressures being created around or proximal to the holder(s) 120. The pressure applied to the second substrate 112 of the PSA block 108 causes the PSA layer(s) to be flattened between the first substrate 110 and second substrate 112. The first substrate 110 and second substrate 112 are selected and utilized for enhancing flatness of the PSA layer(s) 114, the substrates (110, 112) also selected and utilized to provide for uniform squeezing of the PSA layer(s) 114. This squeezing or flattening of the PSA layer(s) 114 provides a PSA product (ex—the planarized or flattened PSA 114) which is suitable for use in rigid-to-rigid lamination processes, such as rigid-to-rigid lamination processes for ruggedization of displays/display products. (ex—lamination of rigid-to-rigid substrates, such as LCDs, OLEDs, Circuit Boards, Heat Sinks, etc.) In exemplary embodiments, the PSA product may have a suitable/desirable level of flatness or thickness and may also have a suitable/desirable degree of uniformity of flatness or thickness.

In current embodiments of the present invention, the planarization tool 102 may be configured with a port 140, said port 140 configured for allowing the planarization tool 102 to be connected to a vacuum pump. In exemplary embodiments of the present invention, as shown in FIG. 6, a vacuum may be created and applied/pulled within the second sealed cavity 138 formed by the planarization tool 102 and the flexible membrane 134. Preferably, the vacuum/vacuum pressure may be ten (10) Torr or less. In further embodiments, the vacuum may be applied within the second sealed cavity 138 while the first sealed cavity 136 is being pressurized and the flexible membrane 134 may apply the pressure created in the first sealed cavity 136 while the vacuum is being pulled in the second sealed cavity 138, thereby enhancing flattening of the PSA 114 during the planarization treatment or process.

In exemplary embodiments of the present invention, the system 100 may include one or more substitute support surfaces 106 configured for being interchanged/substituted for the support surface 106 of the planarization tool 102. Further, the substitute support surface(s) 106 may be configured with at least one PSA block holder 120, the PSA block holder(s) 120 of the substitute support surface(s) 106 differing in size and/or number from the holder(s) 120 of the support surface 106 of the planarization tool 102. For example, the system 100 of the present invention may be utilized for flattening PSA layers 114 of various dimensions/sizes, such as to make them suitable for use in laminating/ruggedization processes for different sized displays. For instance, the support surface 106 may have four holders 120, each sized for receiving PSA layers 114 for use in five-inch displays, while a substitute support surface 106 may have one, larger holder 120, sized for receiving larger PSA layers 114 which may be used in creating larger, ruggedized, rigid-to-rigid laminated displays. In additional embodiments, the system 100 of the present invention may also have one or more substitute carriages 124 configured for being interchanged/substituted for the carriage 124 of the planarization tool 102. The substitute carriage 124 may form at least one PSA block access aperture 126 for allowing physical access to PSA block(s) 108 positioned within PSA block holder(s) 120 of the substitute support surface 106. Further, the PSA block access aperture(s) of the substitute carriage 124 may differ in size and/or number from the aperture(s) of the carriage 124. For example, if the support surface 106 includes four holders 120, the carriage 124 may have four apertures 126 correspondingly sized with the holders 120, while if the substitute support surface 106 has one, larger holder 120, the substitute carriage 124 (which is used with the substitute support surface 106) may have a single correspondingly-sized aperture to allow for physical access to the single, larger-sized PSA layer(s) 114 supported on the substitute surface 106. In alternative embodiments, the larger-size PSA layer(s) 114 may be cut to size so as to be suitably sized for utilization with differently sized carriages 124, support surfaces 106 and/or holders 120.

Figure 7:
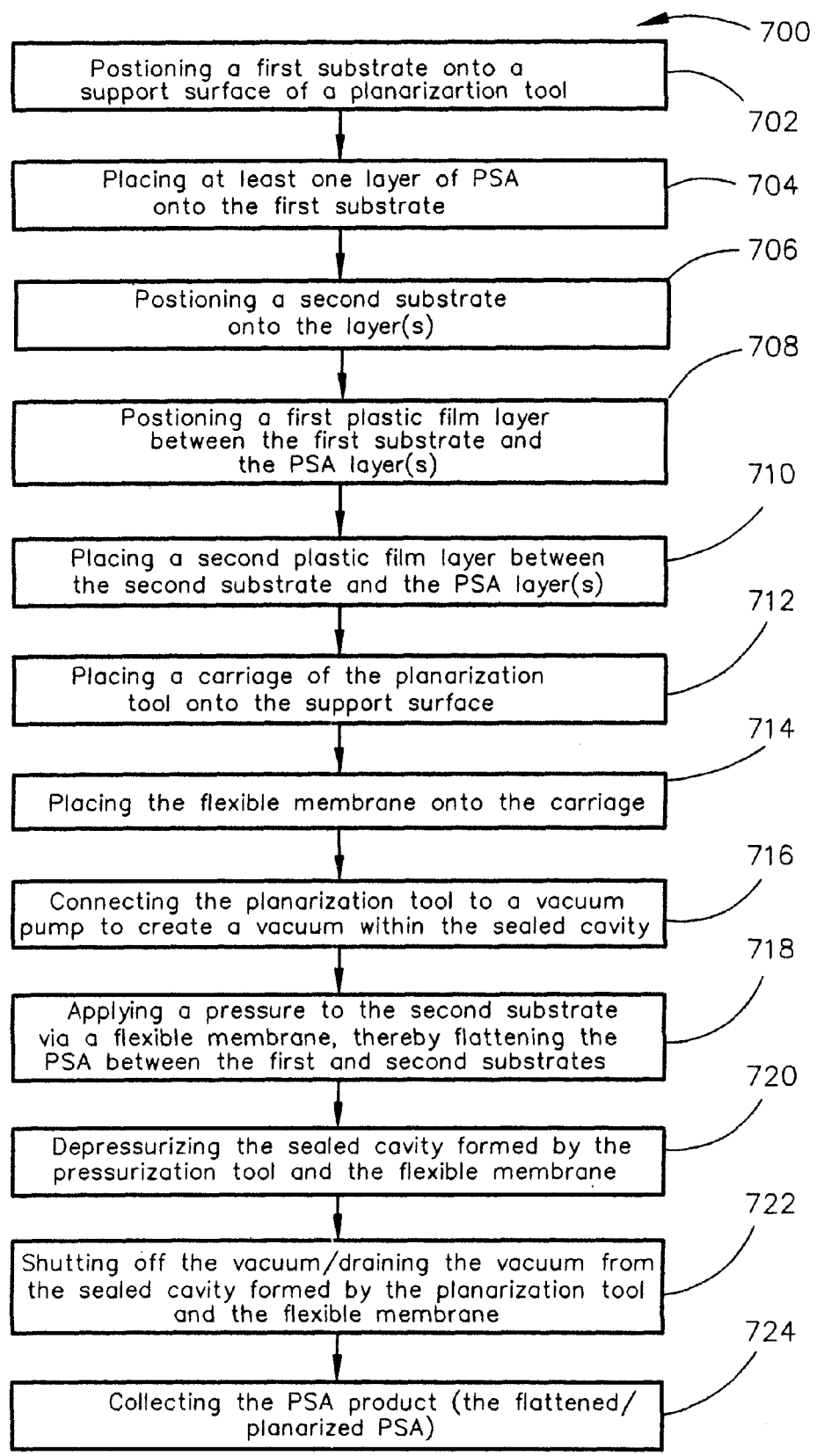
FIG. 7 is a flow chart depicting a process for performing a planarization treatment of pressure-sensitive adhesive (PSA) in accordance with an exemplary embodiment of the present invention.

FIG. 7 illustrates a process for performing a planarization treatment of pressure-sensitive adhesive (PSA). The process 700 may include the step of positioning a first substrate onto a support surface of a planarization tool 702. For instance, the first substrate 110 may be a glass plate positioned onto the support surface 106 of the planarization tool 102. The process 700 may further include placing at least one layer of PSA onto the first substrate 704. For example, one or multiple layers of commercially available PSA 114 may be stacked onto the first substrate (ex—glass plate 110). The process 700 may further include positioning a second substrate onto the layer(s) of PSA 706. For instance, the second substrate 112 may be a thick glass top plate placed onto the layer(s) of PSA 114 for "sandwiching" the PSA 114 between the first substrate 110 and second substrate 112.

In exemplary embodiments, the process 700 may further include applying a pressure to the second substrate via a flexible membrane 718. In further embodiments, the pressure is applied by the flexible membrane 134 to the second substrate 112 in a generally uniform, unidirectional and localized manner. The applied pressure may flatten the PSA 114 between the first substrate 110 and the second substrate 112 for promoting suitability of the PSA 114 for use in rigid-to-rigid lamination processes. The step of applying a pressure to the second substrate via the flexible membrane 718 may include the sub-step of placing the planarization tool 102 into a pressurization tool 128, such as a press. The pressurization tool 128 may be utilized to apply the pressure via the flexible membrane 134 to the second substrate 112/PSA block(s) 108, as previously described above. The step of applying a pressure to the second substrate via the flexible membrane 718 may further include the sub-step of directing a partial enclosure 130 of the press 128 against the flexible membrane 134, said flexible membrane 134 having been positioned upon the planarization tool 102, thereby "sandwiching" the flexible membrane 134 between the planarization tool 102 and the pressurization tool/press 128. The step of applying a pressure to the second substrate via the flexible membrane 718 may further include connecting the port 132 of the pressurization tool 128 to a pressurization source for creating the applied pressure within the sealed cavity (ex—for pressurizing the sealed cavity) 136 formed by the flexible membrane 134 and pressurization tool 128. The flexible membrane 134 may be configured for applying the pressure created within the first sealed cavity 136 to the PSA block(s) 108 positioned on the support surface 106 of the planarization tool 102. For instance, the positive pressure created within the first sealed cavity 136 may cause the flexible membrane to expand and be directed through/via the aperture(s) 126 of the carriage 124 against the second substrate 112 (ex—cover glass layer) of the PSA block, thereby exerting the applied pressure against the PSA block.

In further embodiments, prior to applying the pressure, the process 700 may further include positioning a first plastic film layer between the first substrate and the PSA layer(s) 708. In additional embodiments, prior to applying the pressure, the process may further include placing a second plastic film layer between the second substrate and the PSA layer(s) 710.

In current embodiments of the present invention, prior to applying the pressure, the process 700 may further include placing a carriage of the planarization tool onto the support surface 712. For example, the carriage 124 may be configured for allowing the applied pressure to be applied to the second substrate 112 in a generally uniform, unidirectional and localized manner. In additional embodiments, prior to applying the pressure, the process 700 may further include placing the flexible membrane onto the carriage 714. For instance, the flexible membrane 134 may be configured for forming a sealed cavity 138 with the planarization tool 102, the sealed cavity 138 containing the PSA block(s) 108, which may include the first substrate 110, the PSA layer(s) 114, the second substrate 112, the first plastic film layer 116 and the second plastic film layer 118.

In exemplary embodiments of the present invention, the process 700 may further include, prior to applying the pressure, connecting the planarization tool to a vacuum pump to create a vacuum within the sealed cavity 716. For example, the vacuum may be created within/applied to the sealed cavity 138 formed by the planarization tool 102 and the flexible membrane 134, thereby applying a vacuum/negative pressure to the PSA block(s) 108, said PSA block(s) may include the first substrate 110, the PSA layer(s) 114, the second substrate 112, the first plastic film layer 116 and the second plastic film layer 118. Preferably, the vacuum/negative pressure and the applied (ex—positive) pressure are concurrently applied to the PSA block(s) 108 (ex—the first substrate 110, the PSA layer(s) 114, the second substrate 112, the first plastic film layer 116 and the second plastic film layer 118). In alternative embodiments of the present invention the positive pressure may be applied to the PSA block(s)

108 prior to applying the vacuum (ex—negative pressure) to the PSA block(s), or the positive pressure may be applied to the PSA block(s) 108 without applying a vacuum/negative pressure to the PSA block(s) 108.

In additional embodiments, once the PSA 114 has been subjected to the applied pressure, the applied vacuum and/or an applied temperature for a desired duration of time (ex— when a desired level of flatness/uniformity of flatness for the PSA has been reached) the process 700 may further include depressurizing the sealed cavity formed by the pressurization tool and the flexible membrane 720. In exemplary embodiments, the process 700 may further include, shutting off the vacuum/draining the vacuum from the sealed cavity formed by the planarization tool and the flexible membrane 722. In alternative embodiments of the process 700 of the present invention, the vacuum may be drained from the second sealed cavity 138 prior to depressurizing the first sealed cavity 136 or, the first sealed cavity 136 may be depressurized prior to draining the vacuum from the second sealed cavity 138. In further embodiments, the process 700 may further include collecting the PSA product (the flattened/planarized PSA 114) 724. For instance, the step of collecting the PSA product 724 may include the sub-steps of: drawing the partial enclosure 130 of the pressurization tool 128 away from the planarization tool 102; removing the flexible membrane 134 from the carriage 124; removing the carriage 124 from the support portion 104; removing the PSA block(s) 108 from the holder(s) 120; removing the second substrate 112; removing the second plastic film layer 118; and removing the PSA product (ex—flattened PSA layer(s) 114) from the first plastic film layer 116 and the first substrate 110.

In current embodiments, the process 700 described above may be performed at various temperatures, such as ambient temperature. For example, the press 128 may have selectable settings for establishing a desired temperature at which the process 700 is to be performed. In further embodiments, PSA 114 may be subjected to the applied pressure and vacuum for varying durations of time, such as a duration ranging from five minutes to twenty-four hours. Preferably, the pressure and vacuum may be concurrently applied to the PSA 114 for at least fifteen minutes. In exemplary embodiments, the process 700 (ex—planarization treatment) of the present invention may implement controlled application of pressure, temperature and time for providing PSA product which is suitable for use in rigid-to-rigid lamination processes. For instance, said PSA product may be planarized (ex—flattened) layers of PSA 114 which are flattened to a suitable/desired level of flatness/thickness and/or to a suitable/desired level of uniformity, such that they may be used during rigid-to-rigid lamination processes to interface between an LCD and a coverglass or touchscreen of a display in a uniform manner for providing a uniform (ex— blotch-free, visual anomaly-free) display. Further, said PSA product may be a cut-to-size component having exceptional edge quality for minimizing edge defects and facilitating automation of said rigid-to-rigid lamination processes for producing low-cost, ruggedized displays.

Figure 8:
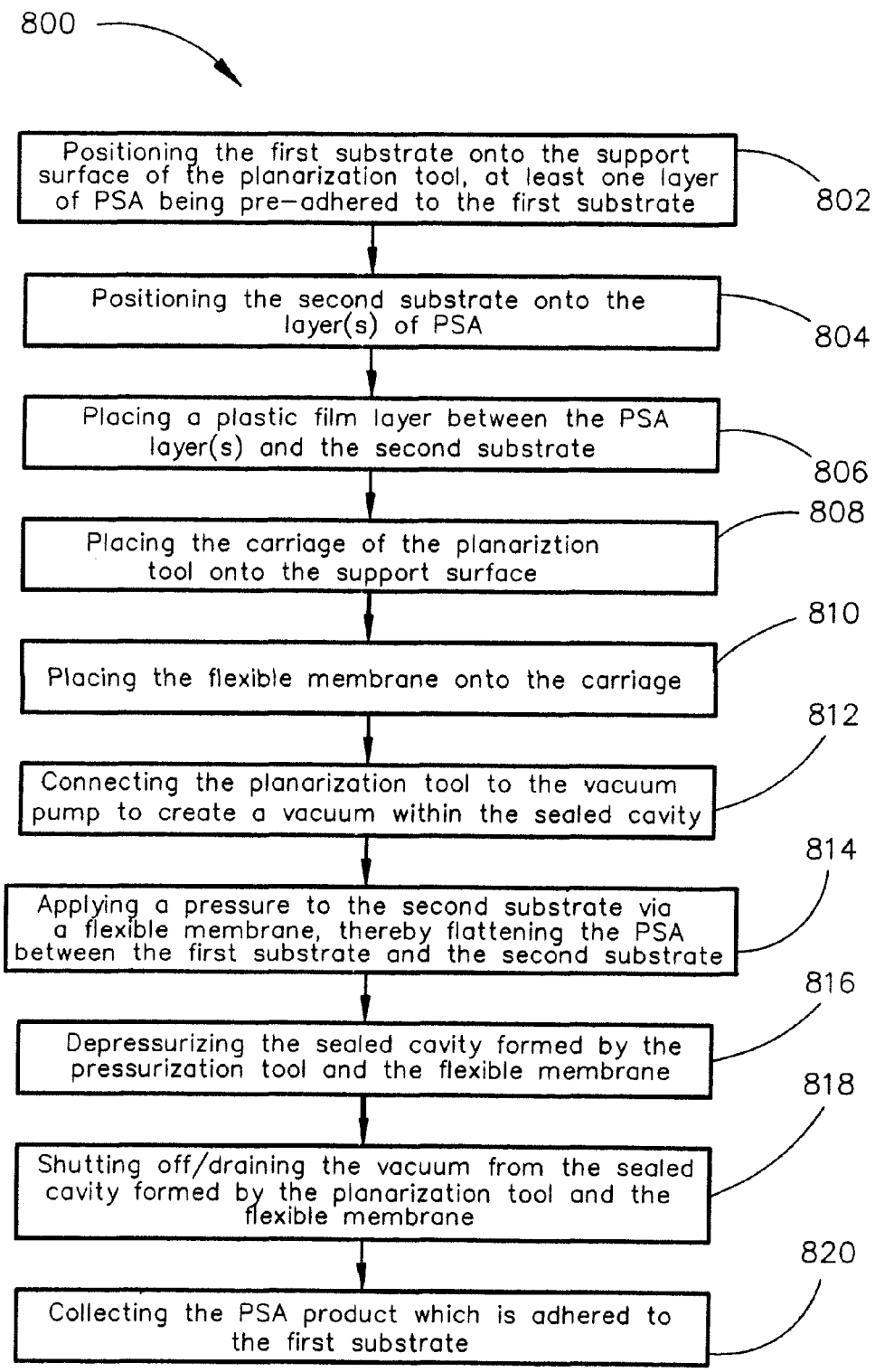
FIG. 8 is a flow chart depicting a process for performing a planarization treatment of pressure-sensitive adhesive (PSA) in accordance with an alternative exemplary embodiment of the present invention.

Referring generally to FIG. 8, for embodiments in which the PSA layer(s) 114 are pre-adhered to the first substrate 110, a process 800 for performing a planarization treatment of pressure-sensitive adhesive (PSA) is shown. In exemplary embodiments, the process 800 includes positioning the first substrate onto the support surface of the planarization tool, such that a first surface of the first substrate is in contact with the support surface and a second surface of the first substrate, generally opposite the first surface, is oriented away from the support surface 802. Further, at least one layer of PSA is pre-adhered to the first substrate.

In further embodiments, the process 800 may further include positioning the second substrate onto the layer(s) of PSA 804. Still further, the process 800 may include applying a pressure to the second substrate via a flexible membrane, said pressure being applied in a generally uniform, unidirectional and localized manner, wherein the applied pressure flattens the PSA between the first substrate and the second substrate for promoting suitability of the PSA for use in rigid-to-rigid lamination processes 814. The process 800 may further include, prior to applying the pressure, placing a plastic film layer between the PSA layer(s) and the second substrate 806. The process 800 may further include, prior to applying the pressure, placing the carriage of the planarization tool onto the support surface 808. The process 800 may further include, prior to applying the pressure, placing the flexible membrane onto the carriage 810. The process 800 may further include, prior to applying the pressure, connecting the planarization tool to the vacuum pump to create a vacuum within the sealed cavity 812. The process 800 may further include, after applying the pressure, depressurizing the sealed cavity formed by the pressurization tool and the flexible membrane 816. The process 800 may further include shutting off/draining the vacuum from the sealed cavity formed by the planarization tool and the flexible membrane 818. The process 800 may further include collecting the PSA product (ex—the flattened/planarized PSA which is adhered to the first substrate (ex—LCD coverglass) 820.

It is to be noted that one or more of the above-referenced systems or processes of the present invention may be adaptable for allowing rolls of PSA to be planarized. For example, one or more of the above-referenced systems may be adaptable to allow for roll-to-roll planarization of PSA, in which a roll of PSA is fed into the system and planarized. Further, one or more of the above-referenced processes may also be variable/adaptable to allow for roll-to-roll planarization.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A system for performing planarization treatment of a pressure-sensitive adhesive (PSA), comprising:
   a planarization tool, the planarization tool including:
      a support portion, the support portion including a support surface;
      a plurality of brackets extending upward from the support surface; and
      a carriage having a plurality of apertures formed therethrough such that when the carriage is positioned on the plurality of brackets, the plurality of brackets extend through the plurality of apertures and the carriage is spaced apart from the support surface, and the carriage and the plurality of brackets collectively define a plurality of holders, each holder configured to receive a PSA block including the PSA, the support portion and the carriage further configured for forming a partial enclosure when the carriage is placed upon the plurality of brackets;
   a pressurization tool configured with a partial enclosure, the partial enclosure of the pressurization tool having a port configured for connection to a pressurizing source;
   a flexible membrane configured for being positioned between the planarization tool and the pressurization tool, the flexible membrane being further configured for sealing the partial enclosure of the pressurization tool to create a first sealed cavity and for sealing the partial enclosure of the planarization tool to create a second sealed cavity when placed between the planarization tool and pressurization tool, the flexible membrane is further configured for applying a pressure created within the first sealed cavity to the PSA block when the first sealed cavity is pressurized,
   wherein the carriage of the planarization tool is configured for causing the flexible membrane to apply the pressure to the PSA block in a generally uniform, unidirectional and localized manner, the applied pressure promoting suitability of the PSA for use in rigid-to-rigid lamination processes.

2. A system as claimed in claim 1, wherein the planarization tool is configured with a port, said port configured for being connected to a vacuum pump.

3. A system as claimed in claim 1, wherein each holder of the plurality of holders is sized for allowing physical access to the PSA block when the PSA block is positioned within the holder.

4. A system as claimed in claim 1, wherein the PSA block further includes a first substrate and a second substrate, the PSA being positioned between the first substrate and the second substrate.

5. A system as claimed in claim 4, wherein at least one of the first substrate and the second substrate is a glass plate.

6. A system as claimed in claim 4, wherein the PSA block further includes a first plastic film layer and a second plastic film layer, the first plastic film layer being positioned between the first substrate and the PSA, the second plastic film layer being positioned between the second substrate and the PSA.

7. A system as claimed in claim 2, wherein the pressure created within the first sealed cavity is applied by the flexible membrane to the PSA block while a vacuum is applied within the second sealed cavity via connection of the vacuum pump with the port of the planarization tool.

8. A system as claimed in claim 1, wherein the flexible membrane is formed at least partly from of silicone.

9. A system as claimed in claim 1, wherein the flexible membrane is formed at least partly from a material having electrostatic discharge (ESD) properties.

10. A system as claimed in claim 1, wherein the flexible membrane is formed at least partly from an elastic material.

11. A system as claimed in claim 3, further comprising:
   a substitute support surface configured for being substituted for the support surface of the planarization tool; and
   a plurality of substitute brackets extending upward from the substitute support surface in a configuration different from the configuration of the plurality of support brackets.

12. A system as claimed in claim 11, further comprising:
   a substitute carriage configured for being substituted for the carriage of the planarization tool, the substitute carriage configured to be positioned on the substitute support surface such that the plurality of substitute brackets extend through a plurality of apertures formed in the substitute carriage, and the substitute carriage and the plurality of substitute brackets collectively define a plurality of substitute holders, each substitute holder configured to receive a substitute PSA block differing in at least one of size and shape from the PSA block.

13. A system as claimed in claim 1, wherein the pressure is a value included in a range of values, the range of values ranging from five (5) pounds per square inch gauge (psig) to two hundred (200) pounds per square inch gauge (psig).

14. A system as claimed in claim 13, wherein the pressure is a value between forty (40) psig and sixty (60) psig.

15. A system as claimed in claim 7, wherein the vacuum is no greater than than ten (10) Torr.

16. A system as claimed in claim 1, wherein the rigid-to-rigid lamination processes include rigid-to-rigid lamination processes for ruggedization of displays.

17. A system as claimed in claim 1, wherein the pressure applied to the PSA flattens the PSA to at least one of a desired level of flatness and a desired degree of uniformity of flatness for promoting production of visual anomaly-free display assemblies when said PSA is implemented in the rigid-to-rigid lamination processes.

18. A system as claimed in claim 4, wherein the first substrate is at least one of a coverglass for a Liquid Crystal Display (LCD) or a touchscreen, the at least one layer of PSA being pre-adhered to the first substrate prior to being positioned between the first substrate and the second substrate.

19. A system for performing planarization treatment of pressure-sensitive adhesive (PSA), comprising:
   a planarization tool, the planarization tool including:
      a support portion, the support portion including a planar support surface configured for supporting a plurality of PSA blocks, each PSA block including the PSA and at least one substrate;

a plurality of brackets extending upward from the support surface; and a carriage having a plurality of apertures formed therethrough such that when the carriage is positioned on the plurality of brackets, upper portions of the plurality of brackets extend through the plurality of apertures and lower portions of the plurality of brackets support the carriage in a spaced apart relationship relative to the support surface, and the carriage and the plurality of brackets collectively define a plurality of rectilinear holders, each holder configured to receive and align the PSA and substrate of the PSA block;

a pressurization tool having a port configured for connection to a pressurizing source;

a flexible membrane configured to be positioned between the planarization tool and the pressurization tool to create a first sealed cavity with the pressurization tool and a second sealed cavity with the planarization tool, wherein the flexible membrane is further configured to apply a pressure created within the first sealed cavity to the plurality of PSA blocks;

wherein during planarization of the plurality of PSA blocks, a bottom surface of each PSA block directly contacts the support surface, and a top surface of each PSA block directly contacts the flexible membrane.

20. The system of claim 1, wherein each of the plurality of brackets includes a stepped configuration defined by an upper portion configured to extend into one of the apertures in the carriage and a lower portion configured to support the carriage.

* * * * *